US007907962B2

United States Patent
Shoji (10) Patent No.: US 7,907,962 B2
(45) Date of Patent: Mar. 15, 2011

(54) RADIO COMMUNICATIONS SYSTEM, BASE STATION APPARATUS AND METHOD OF TRANSMISSION POWER CONTROL

(75) Inventor: Hiroyuki Shoji, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 591 days.

(21) Appl. No.: 11/587,612

(22) PCT Filed: Mar. 10, 2005

(86) PCT No.: PCT/JP2005/004252
§ 371 (c)(1),
(2), (4) Date: Aug. 20, 2007

(87) PCT Pub. No.: WO2005/107101
PCT Pub. Date: Nov. 10, 2005

(65) Prior Publication Data
US 2008/0102875 A1 May 1, 2008

(30) Foreign Application Priority Data
Apr. 27, 2004 (JP) ................................. 2004-132268

(51) Int. Cl.
*H04B 7/00* (2006.01)
(52) U.S. Cl. ............................. 455/522; 455/68; 455/69
(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| 6,415,161 | B1 * | 7/2002 | Fujita | 455/561 |
|---|---|---|---|---|
| 6,498,785 | B1 * | 12/2002 | Derryberry et al. | 370/311 |
| 6,625,138 | B2 * | 9/2003 | Karna et al. | 370/342 |
| 6,708,041 | B1 * | 3/2004 | Butovitsch et al. | 455/522 |
| 6,928,287 | B2 * | 8/2005 | Trott et al. | 455/447 |
| 6,987,982 | B2 * | 1/2006 | Willenegger et al. | 455/515 |
| 7,043,212 | B1 * | 5/2006 | Mitjana | 455/127.1 |
| 7,103,319 | B2 * | 9/2006 | Cai et al. | 455/69 |
| 7,164,660 | B2 * | 1/2007 | Baker et al. | 370/318 |
| 7,197,021 | B2 * | 3/2007 | Seo et al. | 370/335 |
| 7,304,971 | B2 * | 12/2007 | Balachandran et al. | 370/337 |
| 7,391,747 | B2 * | 6/2008 | Li | 370/318 |
| 7,512,086 | B2 * | 3/2009 | Choi et al. | 370/328 |
| 2002/0183086 | A1 * | 12/2002 | Hellmark et al. | 455/522 |
| 2003/0054829 | A1 * | 3/2003 | Moisio | 455/452 |
| 2004/0018850 | A1 | 1/2004 | Ishiguro et al. | |
| 2004/0136354 | A1 * | 7/2004 | Li | 370/342 |
| 2004/0147274 | A1 * | 7/2004 | Khawand et al. | 455/522 |
| 2004/0179480 | A1 * | 9/2004 | Attar et al. | 370/252 |

(Continued)

FOREIGN PATENT DOCUMENTS

EP 0 741 467 A2 11/1996

(Continued)

*Primary Examiner* — Duc M. Nguyen
*Assistant Examiner* — Dominic E Rego
(74) *Attorney, Agent, or Firm* — DLA Piper LLP (US)

(57) ABSTRACT

A transmission power of a communication apparatus can be appropriately determined in accordance with different communication multiplicities between two or more communication channels. A mobile communication system in which a base station apparatus and a mobile station apparatus communicate with each other by using configuration channels (CCH) or random access channels (RACH) includes a transmission power control part for determining basic data of the transmission power in RACH of the mobile station apparatus in accordance with a communication status in CCH, and a transmission power determining part for determining the transmission power in RACH of the mobile station apparatus by changing the basic data at least in accordance with the communication multiplicity of RACH.

6 Claims, 5 Drawing Sheets

U.S. PATENT DOCUMENTS

2006/0166690 A1* 7/2006 Nishio et al. .................. 455/522
2006/0279435 A1* 12/2006 Krishnan et al. ................ 341/29
2007/0171840 A1* 7/2007 Kim et al. ..................... 370/252

FOREIGN PATENT DOCUMENTS

| JP | 2003-244070 | 8/2003 |
|----|-------------|--------|
| JP | 2004-112761 | 4/2004 |

* cited by examiner

BASE STATION APPARATUS 2

RADIO COMMUNICATIONS SYSTEM, BASE STATION APPARATUS AND METHOD OF TRANSMISSION POWER CONTROL

TECHNICAL FIELD

This invention relates to a radio communications system, a base station apparatus and a method of the transmission power control.

BACKGROUND ART

In radio communications, there are cases where two or more communication channels with different communication multiplicities could be used for radio communications. For example, some mobile communication systems such as PHS (Personal Handyphone System) adopting the SDMA (Space Division Multiple Access) method use two logical channels which are CCH (Configuration Channels) and RACH (Random Access Channels). In CCH communications multiplexing by spatial multiplexing are not performed, and in RACH communications multiplexing by spatial multiplexing are performed.

Here, the patent document 1 discloses a patent related to a method for the power control in wireless networks.

Patent document 1: EP Patent Application No. 0741467

DISCLOSURE OF THE INVENTION

Problems to be Solved by the Invention

When communications are started in the aforementioned mobile communication systems, synchronous processes between base station apparatus and mobile station apparatus, registration processes, etc. are to be processed in CCH. Then next, channel allocation processes etc. are to be processed in RACH. In these cases, the transmission power control of the mobile station apparatus is performed by an open loop control. Later, the communications begin in traffic channels, and then the transmission power control is performed by a closed loop control.

Therefore, the results of the open loop control in CCH will be reflected on the signal transmission in RACH. However, in many cases the noise levels of RACH and CCH are different because of the different spatial multiplicities between RACH and CCH, so that a good communication result could not be obtained even though the result of the open loop control in CCH is reflected on the communications in RACH. That is, the transmission power of mobile station apparatus have not been appropriately controlled in accordance with the different communication multiplicities between two or more communications channels, thus affecting the communication result.

The present invention is proposed based on a consideration of the above problem. The purpose is to provide a radio communications system, a base station apparatus and a method of transmission power control which allow appropriate determination of a transmission power of a communication apparatus in accordance with different communication multiplicities between two or more communication channels.

Means for Solving the Problem

In order to solve the above problem, the present invention provides a radio communications system including a plurality of communication apparatuses, comprising a first communication device which a first communication apparatus and a second communication apparatus communicate with each other by using a first communication channel, a second communication device which the first communication apparatus and the second communication apparatus communicate with each other by using a second communication channel, a transmission power basic data determiner which determines basic data of the transmission power in the second communication channel of the second communication apparatus in accordance with a communication status in the first communication channel, and a transmission power determiner which determines the transmission power in the second communication channel of the second communication apparatus by changing the determined basic data of the transmission power at least in accordance with the communication multiplicity of the second communication channel.

By doing this, the transmission power of the communication apparatus can be appropriately determined in accordance with different communication multiplicities between two or more communication channels.

In addition, in the aforementioned radio communications system, the transmission power determiner may change the determined basic data of the transmission power further in accordance with the communication multiplicity of the first communication channel.

Further, in the aforementioned radio communications system, the transmission power determiner may determine the transmission power in the second communication channel of the second communication apparatus in such a way that the higher the communication multiplicity of the second communication channel, the greater this transmission power.

Moreover, in the aforementioned radio communications system, at least the communication multiplicity in the second communication channel may be a spatial multiplicity.

In addition, a base station apparatus according to the present invention is a base station apparatus used in a mobile communication system, including a first communication device for communicating with a mobile station apparatus by using the first communication channel, a second communication device for communicating with the mobile station apparatus by using the second communication channel, and a transmission power determiner which determines the amount of change in the basic data of transmission power determined by a transmission power basic data determiner at least in accordance with the communication multiplicity of the second communication channel.

Further, a transmission power control method according to the present invention includes a first communication step in which a first communication apparatus and a second communication apparatus communicate with each other by using a first communication channel, a second communication step in which the first communication apparatus and the second communication apparatus communicate with each other by using a second communication channel, a step of determining basic data of the transmission power in the second communication channel of the second communication apparatus in accordance with a communication status in the first communication channel, and a step of determining the transmission power in the second communication channel of the second communication apparatus by changing the determined basic data of the transmission power at least in accordance with the communication multiplicity of the second communication channel.

BEST MODE FOR CARRYING OUT THE INVENTION

Referring to drawings, an embodiment of the present invention is described hereinafter.

Figure 1:
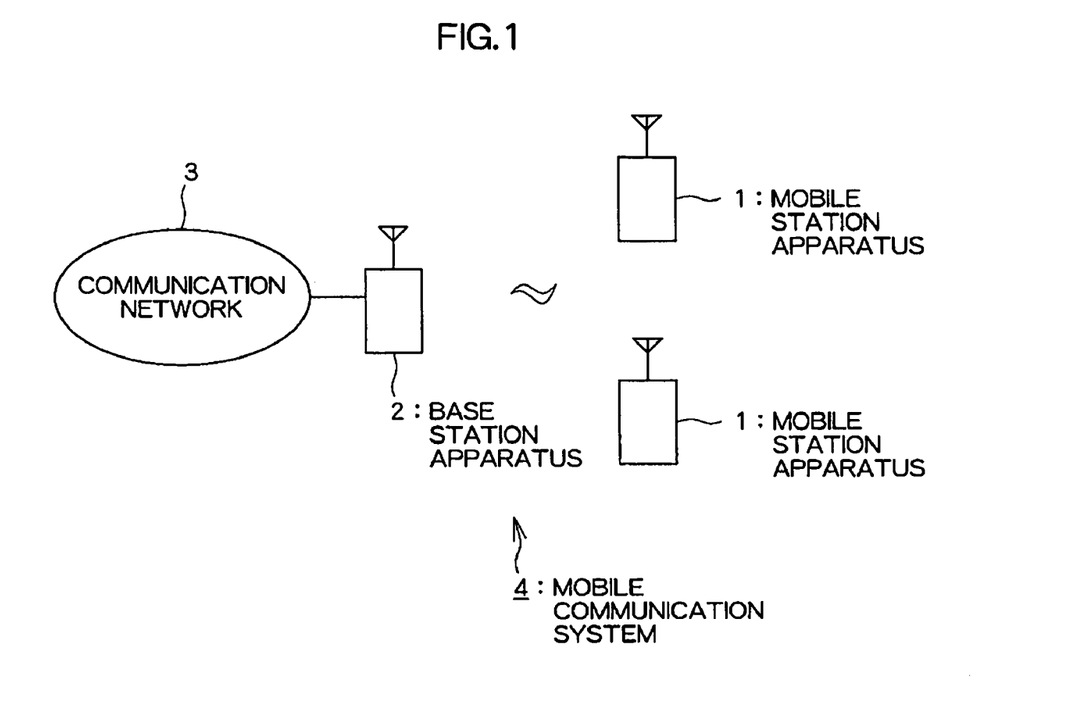
FIG. 1 is a configuration diagram of a mobile communication system according to an embodiment of the present invention.

As shown in FIG. 1, a mobile communication system 4 according to this embodiment is configured with a plurality of mobile station apparatuses 1, a base station apparatus 2, and a communication network 3. The base station apparatus 2 typically communicates with the communication network 3 and each of the mobile station apparatuses 1.

Figure 2:
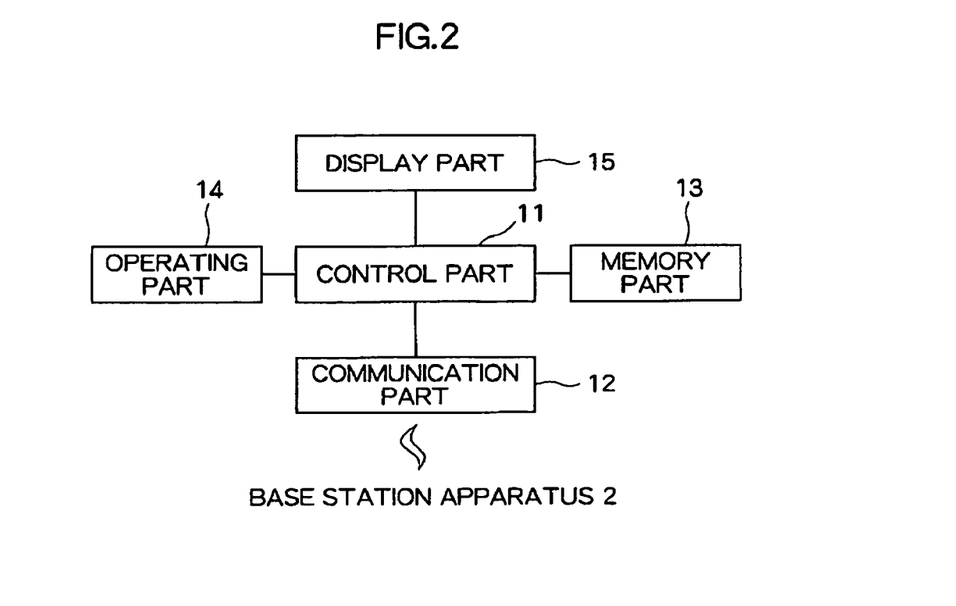
FIG. 2 is a configuration block diagram of a mobile station apparatus according to an embodiment of the present invention.

As shown in FIG. 2, the mobile station apparatus 1 includes a control part 11, a communication part 12, a memory part 13, an operating part 14, and a display part 15. The control part 11 controls each part of the mobile station apparatus 1 and performs processes related to telephone calls and data communications. The communication part 12, which has antennas, performs processes such as modulating audio signals, communication packets, etc. and then transmitting through the antennas in accordance with instructions provided by the control part 11, and receiving and demodulating audio signals, communication packets, etc. arriving at the antennas and then outputting to the control part 11. The memory part 13 operates as a work memory for the control part 11. This memory part 13 also holds programs and parameters for various processes performed by the control part 11. The operating part 14 is, for example, a numeric keypad etc. for receiving phone numbers and character strings input from users and outputting to the control part 11. The display part 15 is, for example, composed of a liquid crystal display, which displays information in accordance with an input from the control part 11.

Figure 3:
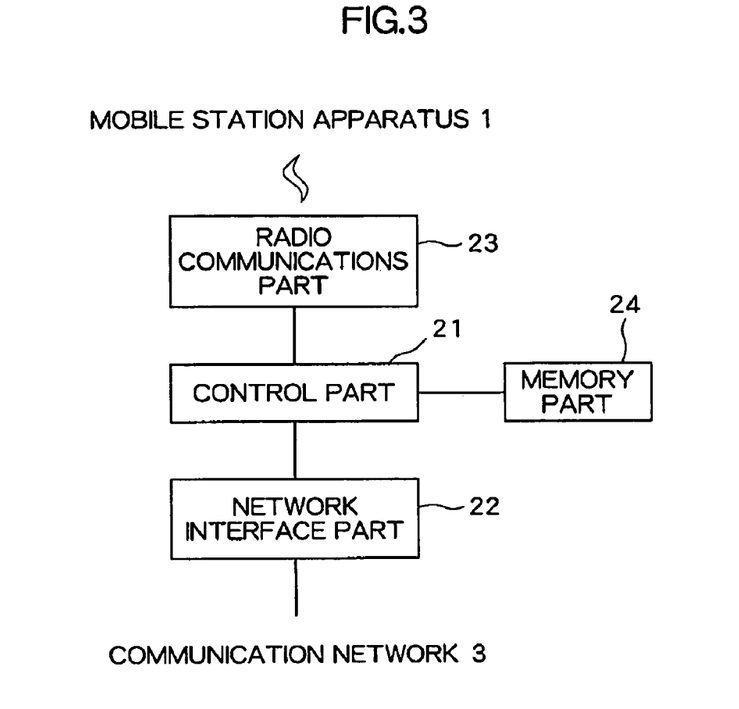
FIG. 3 is a configuration block diagram of a base station apparatus according to an embodiment of the present invention.

As shown in FIG. 3, the base station apparatus 2 includes a control part 21, a network interface part 22, a radio communications part 23, and a memory part 24. The control part 21 controls each part of the base station apparatus 2 and performs processes related to telephone calls and data communications. The network interface part 22, which is connected to the communication network 3, receives audio signals, communication packets, etc. and outputs to the control part 21, and also transmits audio signals, communication packets, etc. to the communication network 3 in accordance with instructions from the control part 21. The radio communication part 23, which has antennas, performs processes such as receiving and demodulating audio signals, communication packets, etc. from each of the mobile station apparatuses 1 and then transmitting to the control part 21, and modulating audio signals, communication packets, etc. provided by the control part 21 and then transmitting through the antennas in accordance with instructions provided by the control part 21. The memory part 24 operates as a work memory for the control part 21. This memory part 24 also holds programs and parameters for various processes performed by the control part 21.

Figure 4:
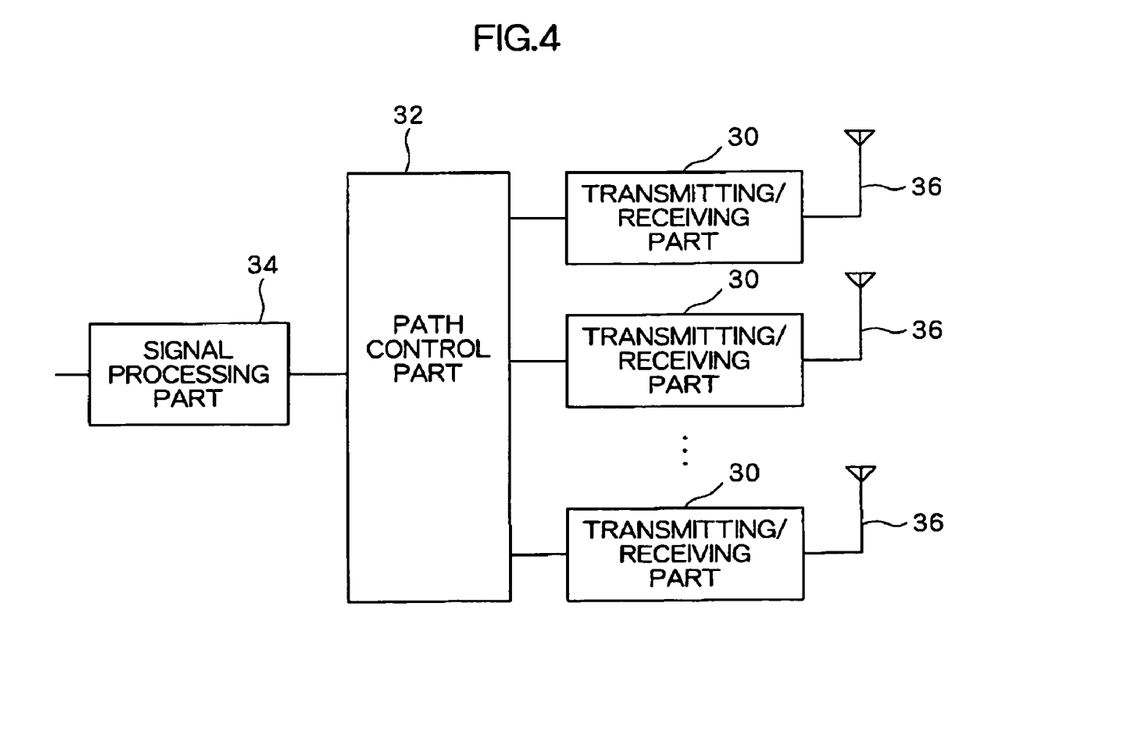
FIG. 4 is a functional block diagram of a base station apparatus according to an embodiment of the present invention.

In terms of the functionality, the radio communications part 23 and the control part 21 of the base station apparatus 2, as shown in FIG. 4, includes a plurality of transmitting/receiving parts 30, a path control part 32, a signal processing part 34. Each transmitting/receiving part 30 has an antenna 36. This plurality of antennas 36 constitute a conventionally well-known adaptive array antenna. A process performed by this configuration is briefly described hereinafter. In the receiving process, each antenna 36 receives audio signals, communication packets, etc. arriving at the antenna. Each transmitting/receiving part 30 converts the frequency of the received radio wave supplied from each antenna 36 and then outputs to the path control part 32. The path control part 32 routes the output from each transmitting/receiving part 30 to the signal processing part 34 which performs the demodulating process and decoding process. The signal processing part 34 obtains received signals based on the correlation between the signals supplied from the path control part 32 and the reference signals. Receiving radio waves by using the plurality of antennas 36 in this way, the base station apparatus 2 can obtain the received signals from each of the mobile station apparatuses 1 correctly even if fading occurs.

In the transmitting process, on the other hand, the signal processing part 34 determines the antenna weight of each antenna for each of the mobile station apparatuses 1 as destination based on the received signals. Each antenna weight is a weight of the transmission power of the signal transmitted from each antenna 36 to the mobile station apparatuses 1. Each transmitting/receiving part 30 then transmits signals from each antenna 36 based on the antenna weight. Electrically controlling each weight of the transmission power in this way, the base station apparatus 2 can emit electromagnetic waves with directivity.

Thus, in the mobile communication system 4 applying an adaptive array antenna can perform communications with high directivity between each of the mobile station apparatuses 1 and the base station apparatus 2. Therefore, the base station apparatus 2 can communicate with each the plurality of mobile station apparatuses 1 at the same frequency at the same time. Such communications are referred to as "spatially multiplexed". For example, the SDMA method is known as this kind of communication method.

In the mobile communication system 4, it is controlled so that the received signal strength at the base station 2 of the radio wave transmitted from each of the mobile station apparatuses 1 may always become equal. This is because in an uplink (a transmission from the mobile station apparatus 1 to the base station apparatus 2) the farther the mobile station apparatus 1 is from the base station apparatus 2, the lower the received signal strength becomes, and the closer these two stations are, the higher the received signal strength becomes. Then the radio waves from the plurality of mobile station apparatuses 1 which communicate with the base station apparatus 2 may interfere with each other. Particularly radio waves which are strong in the received signal strength may cause interference with radio waves which are weak in the received signal strength, and therefore a demodulation at the base station apparatus 2 may be affected. In a case like this, the number of multiple access within the same time slot needs to be reduced in order to improve the accuracy of the demodulation, causing a lowering of the total throughput.

More concretely, the mobile communication system 4 performs a transmission power control in coordination with each communication environment, for example, by an open loop control in BCH (Broadcast Channel), CCH and RACH, and a closed loop control in TCH (Traffic Channel), coordinating the transmission power so that a demodulatable certain level of SINR (Signal-to-Interference Noise Ratio) can be obtained. In addition, it is intended to improve the communication quality by selecting an appropriate modulation class by the link adaptation.

The aforementioned open loop control is performed through BCH, CCH, and RACH. However, the process in BCH and CCH is performed either in a different carrier or different time slot from those of RACH and TCH. Concretely, spatial multiplexing is used in RACH and TCH, while spatial multiplexing is not used in BCH and CCH. For example, when using the spatial multiplexing method in which one time slot is used by three communications, a transmission power obtained by the open loop control in BCH and CCH may not meet the communication environment of RACH and TCH. This is because there are cases where each value of the noise levels which form a noise floor inherent in a time slot is different from each other due to the different spatial multiplicities between BCH & CCH and RACH & TCH. In general, the higher the spatial multiplicity, the greater the noise floor becomes because of an effect of the interference wave from the mobile station apparatuses 1 which are spatially multiplexed in the same time slot. Therefore, with the transmission power determined by the open loop control in BCH and CCH, the received signal strength at the base station apparatus 2 is sometimes too small to demodulate the signal.

This embodiment of the present invention makes it possible to appropriately determine the transmission power of a communication apparatus in accordance with different communication multiplicities of two or more communication channels by using communication multiplicities represented by the above spatial multiplicities as one of the parameters to determine the transmission power in the open loop control. A concrete configuration to make communication multiplicities one of the parameters to determine the transmission power in the open loop control is described hereinafter.

Figure 5:
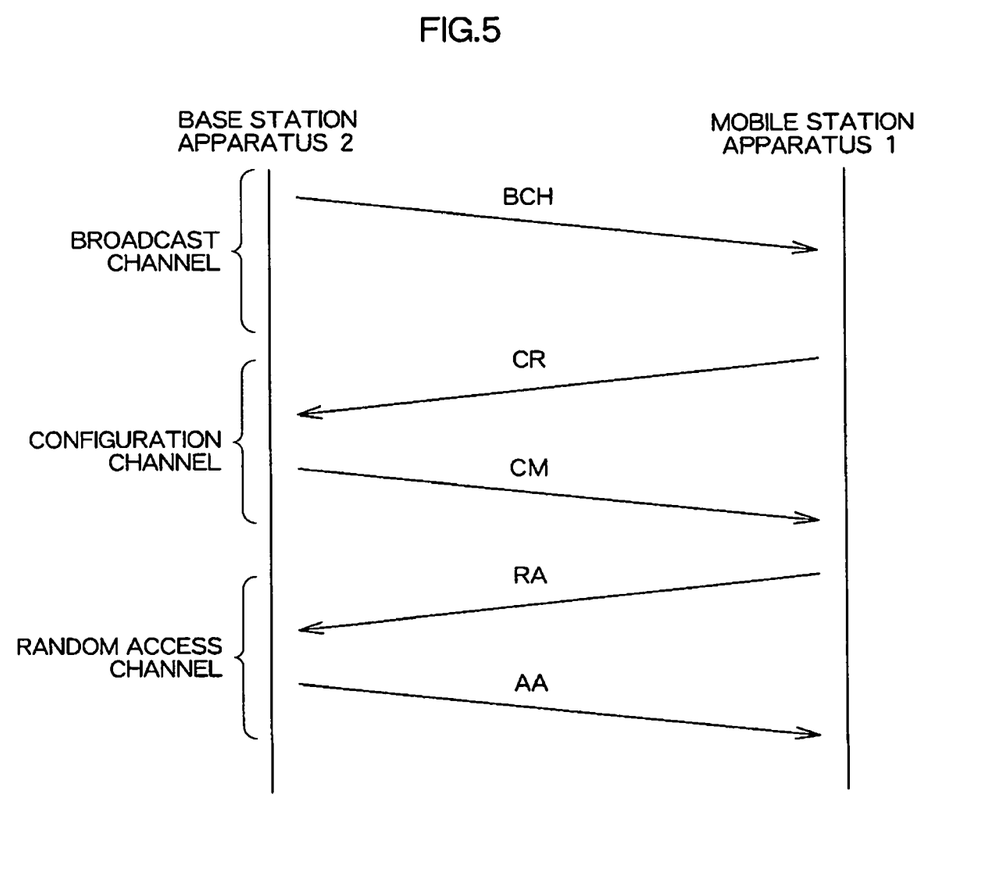
FIG. 5 is a sequence diagram of a mobile communication system according to an embodiment of the present invention.

In a mobile communication system 4 communication is established in a sequence shown in FIG. 5, when a base station apparatus 2 and a mobile station apparatus 1 start the communication. First the mobile station apparatus 1 receives a BCH broadcasted from the base station apparatus 2 and then performs processes such as determining a base station apparatus 2 to be its communication counterpart and confirming synchronization. Then the mobile station apparatus 1 uses CCH to perform determination of the transmission power, establishment of synchronization and determination of the channel for the base station apparatus 2 determined as a communication counterpart. In CCH a signal transmitted from a mobile station apparatus 1 to a base station apparatus 2 is called a "configuration request" (CR) and a signal transmitted from a base station apparatus 2 to a mobile station apparatus 1 is called a "configuration message" (CM). The transmission power used in this phase is determined by the mobile station apparatus 1 in accordance with a received signal strength of BCH or CM at the mobile station apparatus 1. This means that the mobile station apparatus 1 can determine how much transmission power is necessary to make the radio wave transmitted by itself to reach the base station apparatus 2 based on the received signal strength of the BCH and CM, since the transmission power of the base station apparatus 2 is constant. This process of transmission power control is called "open loop control".

Then, call registration, channel allocation, etc. are processed by using RACH. This means that processes to start a call processing are performed. In RACH a signal transmitted from a mobile station apparatus 1 to a base station apparatus 2 is called a "request access" (RA) and a signal transmitted from a base station apparatus 2 to a mobile station apparatus 1 is called an "access assignment" (AA). When the process completes in RACH, the call is established and then communication starts in the data channel (not shown in figures). Once call processing starts in the data channel, the transmission power control is performed by receiving a reception status of the communication counterpart's apparatus. This process of transmission power control is called "closed loop control". Here a logical channel which performs controls such as BCH, CCH and RACH and others is called a "control channel". In addition, a logical channel such as a data channel is called a "traffic channel".

As described above, communications in the first communication channel represented by BCH and CCH, and communications in the second communication channel represented by RACH are performed using different physical channels. Thus, the second communication channel allows the base station apparatus 2 to determine the antenna weight based on the radio wave transmitted by each of the mobile station apparatuses 1 and then allow spatial multiplexing, while the first communication channel does not allow spatial multiplexing since the base station apparatus 2 does not know the location of each of the mobile station apparatuses 1. In other words, the first communication channel and the second communication channel have different communication multiplicities. The second communication channel will start to be used after the first communication channel. The initial transmission power of the mobile station apparatus 1 in the second communication channel will be the transmission power determined by the open loop control in the first communication channel.

Figure 6:
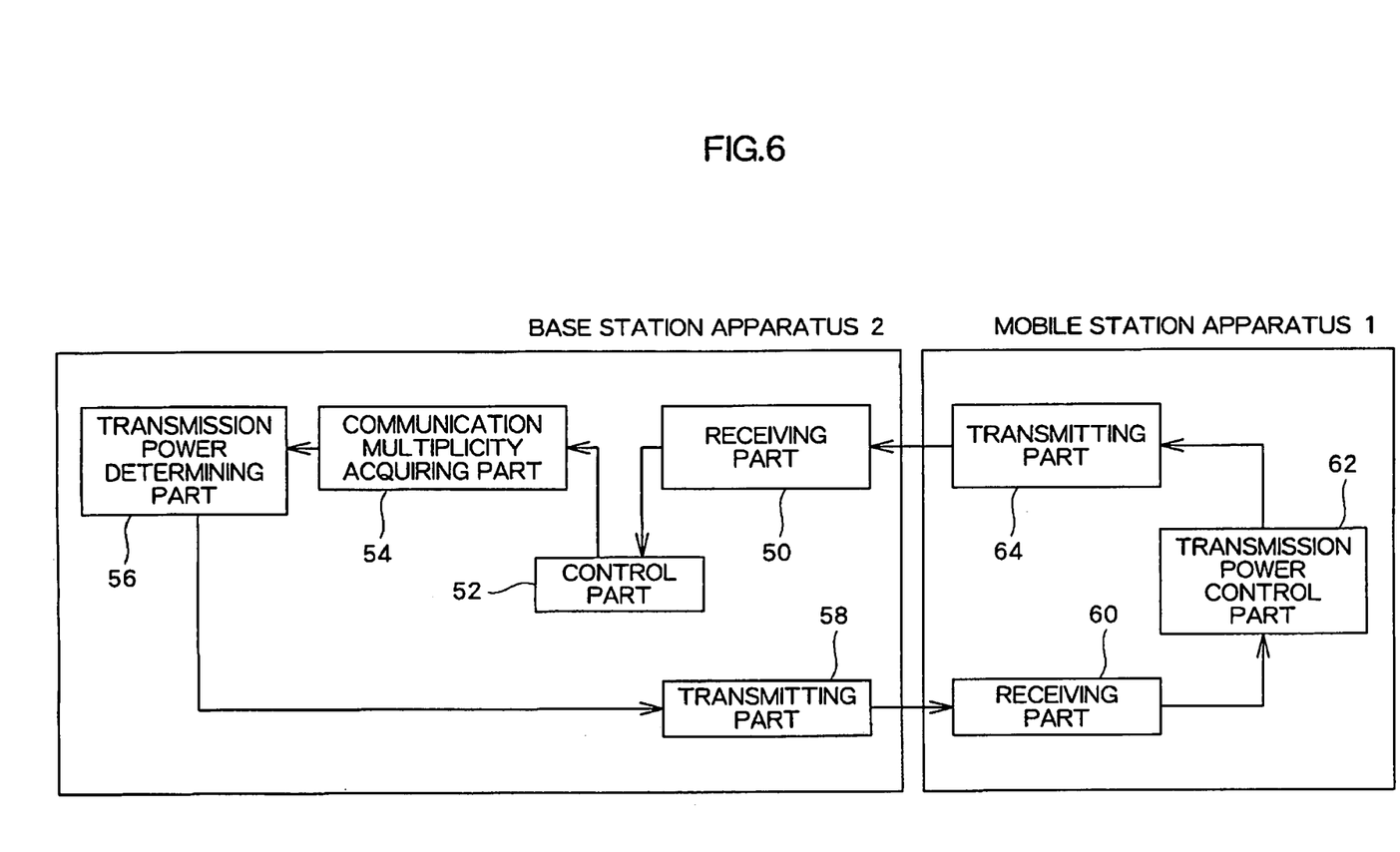
FIG. 6 is a functional block diagram of a mobile communication system according to an embodiment of the present invention.

Differing from the first communication channel, the communications in the second communication channel are multiplexed. This means that it could suffer from interference with radio waves used by other mobile station apparatuses 1 which are multiplexed counterparts. Therefore, depending on the degree of the interference, signals particularly in the second communication channel may not be modulated or demodulated at the base station apparatus 2 without increasing its transmission power. Thus in the open loop control which determines the transmission power in accordance with the communication status in the first communication channel, not only is the communication status in the second communication channel unknown, but also the mobile station apparatus 1 does not know the interference status at the base station apparatus 2, and so the mobile station apparatus 1 cannot perform an appropriate transmission power control and the base station apparatus 2 may not be able to modulate or demodulate received signals in some cases. In order to prevent this, the mobile communication system 4 determines the transmission power of the mobile station apparatus 1 in accordance with the communication multiplicity in the base station apparatus 2. FIG. 6 shows a concrete functional block diagram of a mobile communication system 4.

A mobile station apparatus 1 in this embodiment is functionally composed of a receiving part 60, a transmission power control part 62 and a transmitting part 64. A mobile station apparatus 2 is functionally composed of a receiving part 50, a control part 52, a communication multiplicity acquiring part 54, a transmission power determining part 56 and a transmitting part 58.

The receiving part 50 receives a radio wave from a mobile station apparatus 1 and outputs to the control part 52. Then the control part 52 in turn executed processing to perform communications multiplexing such as, for example, a calculation of antenna weight in regards to spatial multiplexing when communication in the second communication channel is performed as a next step. The communication multiplicity acquiring part 54 acquires a communication multiplicity, which is the number of mobile station apparatuses 1 which are multiplexed in the second communication channel by the control part 52. The communication multiplicity acquiring part 54 outputs the acquired communication multiplicity to the transmission power determining part 56 and then the transmission power determining part 56 determines the amount of change in the transmission power of the mobile station apparatus 1 based on this communication multiplicity. Since the higher the communication multiplicity of the second communication channel is, the greater the above described interference typically becomes, the above amount of change may be determined so that the higher the communication multiplicity of the second communication channel is, the greater the transmission power of the first mobile station apparatus 1 becomes.

Once a process by the closed loop control begins, the amount of change in this transmission power is not required. Therefore it is considered that an increase in a transmission power of other mobile station apparatuses 1 will hardly occur by this process at the same time in the event of an increase in the transmission power of the mobile station apparatus 1. Thus an effect on the call process by the increased interference caused by the rising transmission power in this process is considered to be negligible.

Then the transmission power determining part 56 outputs to the transmitting part 58 the above amount of change in the transmission power of the mobile station apparatus 1, and in turn the transmitting part 58 transmits this amount of change to this mobile station apparatus 1.

The mobile station apparatus 1 receives this amount of change at the receiving part 60 and outputs to the transmission power control part 62. Here the transmission power control part 62 measures a communication status of a received signal (e.g. transmission loss) in the first communication channel and determines the basic data of the transmission power in the first communication channel and as well as the transmission power in the second communication channel of the mobile station apparatus 1 in accordance with the measured communication status (Open loop control). The transmission power control part 62 changes the basic data of the transmission power by adding this amount of change provided by the receiving part 60 to the basic data of the transmission power in the second communication channel determined by the open loop control, thus determining the transmission power, and then outputs the determined transmission power to the transmitting part 64. The transmitting part 64 then performs a transmission in the second communication channel at this provided transmission power.

The transmission power determining part 56 does not only determine the above amount of change in accordance with the communication multiplicity in the second communication channel as in the above process, but may also be configured to determine the above amount of change in accordance with the communication multiplicity in the first communication channel. That means, that although the configuration of the above example does not adopt a communication multiplicity in the first communication channel, it is clearly seen that a communication multiplicity may be performed in the first communication channel in some cases. In this case, in order to more appropriately reflect the difference between interferences caused by the communications multiplexing in the first communication channel and the second communication channel, it is desirable to determine the transmission power of the mobile station apparatus 1 in the second communication channel in accordance with the difference or ratio between the communication multiplicities in the first communication channel and the second communication channel.

Referring to a flowchart the aforementioned process is further described in detail.

Figure 7:
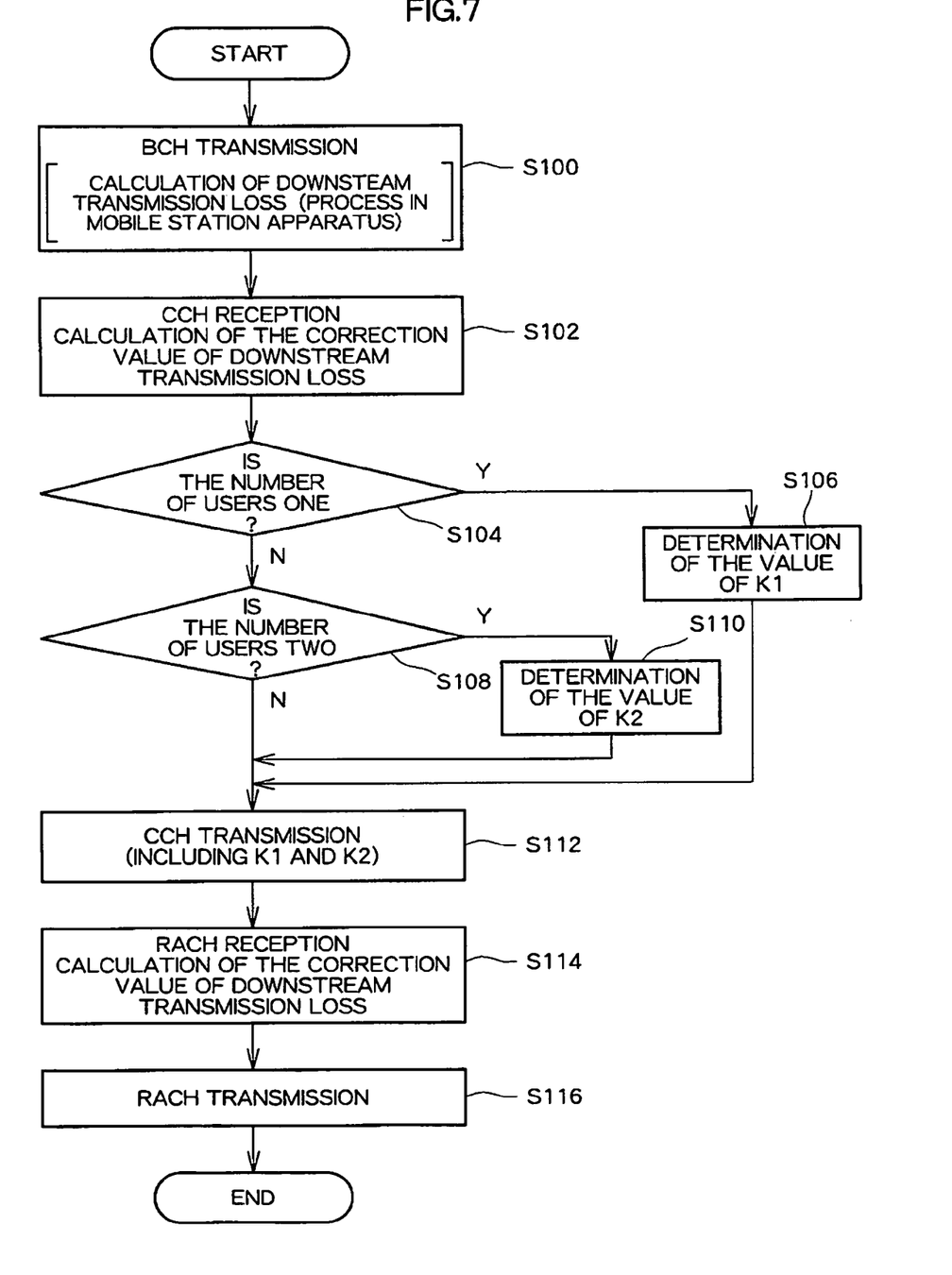
FIG. 7 is a process flowchart of a base station apparatus according to an embodiment of the present invention.

FIG. 7 shows a detailed flowchart of the process of a base station apparatus 2 in an embodiment of the present invention. The maximum communication multiplicity in this flowchart is set to 3. It is clearly understood that it can be applicable to various communication multiplicities in practice. First, a base station apparatus 2 transmits a BCH (S100). Then a mobile station apparatus 1 calculates downstream transmission loss (S100). This downstream transmission loss will also be used for an open loop control in the mobile station apparatus 1. This means that the mobile station apparatus 1 uses the downstream transmission loss as a communication status and can determine the transmission power or the basic data of the transmission power of this mobile station apparatus 1 in accordance with this communication status. Secondly, a CR is received in CCH (S102). Here the base station apparatus 2 calculates a correction value to correct the transmission power of this base station apparatus 2 based on the downstream transmission loss information included in this CR (S102). This correction is a process for determining the transmission power of the base station apparatus 2 by open loop control.

Then the base station apparatus 2 judges whether or not the number of users already communicating in the physical channel used in the RACH is one (S104). This number of users is, in other words, the communication multiplicity. The base station apparatus 2 determines the value of K1 when this number of users is one (S106). If the number of users is not one, the base station apparatus 2 judges whether or not the number of users already communicating in the physical channel used in the RACH is two (S108). If the number of the users is two, the base station apparatus 2 determines the value of K2 (S110). Here, K1 is the amount of change in the transmission power with which the mobile station apparatus 1 is transmitting a RA in the case that the communication multiplicity is 1. K2 is the amount of change in the transmission power with which the mobile station apparatus 1 is transmitting a RA in the case that the communication multiplicity is 2. Thus the base station apparatus 2 determines the amount of change in the transmission power of the mobile station apparatus 1 in accordance with the communication multiplicity in this base station apparatus 2. Then, the base station apparatus 2 transmits a CM in CCH (S112). At this time, the base station apparatus 2 can transmit this CM including K1 and K2. In this way, the base station apparatus 2 informs the mobile station apparatus 1 of the amount of change in the transmission power. The base station apparatus 2 may transmit either K1 or K2 required in accordance with the communication multiplicity. In addition the base station apparatus 2 may be configured to transmit information indicating this amount of change and the mobile station apparatus 1 may be configured to acquire the amount of change by reading the amount of change recorded in, for example, the memory part 13 based on the information indicating this amount of change.

The mobile station apparatus 1 determines a transmission power of the RA based on this amount of change acquired and the basic data of the transmission power in RACH of this mobile station apparatus determined by an open loop control in accordance with the received power of the CM in the mobile station apparatus, and then transmits the RA with this transmission power. In other words, the mobile station apparatus 1 determines a transmission power of the RA by adding this acquired amount of change to the basic data of the transmission power in RACH of this mobile station apparatus determined by an open loop control in accordance with the received power of the CM in the mobile station apparatus.

Then the base station apparatus 2 receives this RA in RACH, and again calculates a correction value to correct the transmission power of the base station apparatus 2 based on the downstream transmission loss information included in this RA (S114). Then, the base station apparatus 2 transmits an AA with this corrected transmission power in RACH (S116).

More concretely, a transmission power of the mobile station apparatus 1 can be determined using the following equations. In the following equations, P' represents basic data and P represents a transmission power of a mobile station apparatus 1. Equation 1 represents the case where the multiplicity is 1, Equation 2 represents the case where the multiplicity is 2, and Equation 3 represents the case where the multiplicity is 3. Therefore the transmission power control part 62 of the mobile station apparatus 1 adds the amount of change which is determined by the transmission power determining part 56 of the base station apparatus 2 corresponding to the communication multiplicity, to the basic data. Moreover this amount of change is recorded corresponding to the communication multiplicity, and so it can be determined by reading out this communication multiplicity recorded in accordance with the communication multiplicity, or these functions are recorded as functions of the communication multiplicity and this amount of change can be determined by calculations which apply these functions to the communication multiplicity.

$$P=P' \quad \text{[Equation 1]}$$

$$P=P'+K1 \quad \text{[Equation 2]}$$

$$P=P'+K2 \quad \text{[Equation 3]}$$

As described above, a transmission power of the mobile station apparatus 1 can be appropriately determined in accordance with the spatial multiplicity. Particularly, by appropriately determining the transmission power of the mobile station apparatus 1 in the second communication channel, the base station apparatus 2 can ensure the reception in the second communication channel. Moreover, in a transmission power control and a link adaptation which can improve the communication quality between a base station apparatus 2 and a mobile station apparatus 1, by controlling the transmission power in transmitting/receiving time-shared data and adopting an appropriate modulation class, the transition from open loop control to closed loop control can be facilitated. In addition, since a reconnection after a disconnection of TCH is facilitated, the throughput of the communications will be improved.

The invention claimed is:

1. A radio communications system including a plurality of communication apparatuses, comprising:
   a first communication device which a first communication apparatus and a second communication apparatus communicate with each other by using a first communication channel, wherein said first communication channel is a configuration channel;
   a second communication device which the first communication apparatus and the second communication apparatus communicate with each other by using a second communication channel, wherein said second communication channel is a random access channel;
   a transmission power basic data determiner which determines basic data of a transmission power in the second communication channel of the second communication apparatus in accordance with a communication status in the first communication channel; and
   a transmission power determiner which determines the transmission power in the second communication channel of the second communication apparatus by changing the determined basic data of the transmission power at least in accordance with a communication multiplicity of the second communication channel, wherein said communication multiplicity is the number of users communicating in the random access channel.

2. A radio communications system according to claim 1, wherein
   the transmission power determiner changes the determined basic data of the transmission power further in accordance with a communication multiplicity of the first communication channel.

3. A radio communications system according to claim 1 or 2, wherein
   the transmission power determiner determines the transmission power in the second communication channel of the second communication apparatus in such a way that the higher the communication multiplicity of the second communication channel, the greater this transmission power.

4. A radio communications system according to claim 1 or 2, wherein
   at least the communication multiplicity in the second communication channel is a spatial multiplicity.

5. A base station apparatus used in a mobile communication system, comprising:
   a first communication device for communicating with a mobile station apparatus by using a first communication channel, wherein said first communication channel is a configuration channel;
   a second communication device for communicating with the mobile station apparatus by using a second communication channel, wherein said second communication channel is a random access channel; and
   a transmission power determiner which determines the amount of change in basic data of a transmission power determined by a transmission power basic data determiner at least in accordance with a communication multiplicity of the second communication channel, wherein said communication multiplicity is the number of users communicating in the random access channel.

6. A transmission power control method, comprising:
   a first communication step in which a first communication apparatus and a second communication apparatus communicate with each other by using a first communication channel, wherein said first communication channel is a configuration channel;
   a second communication step in which the first communication apparatus and the second communication apparatus communicate with each other by using a second communication channel, wherein said second communication channel is a random access channel;
   a step of determining basic data of a transmission power in the second communication channel of the second communication apparatus in accordance with a communication status in the first communication channel; and
   a step of determining the transmission power in the second communication channel of the second communication apparatus by changing the determined basic data of the transmission power at least in accordance with a communication multiplicity of the second communication channel, wherein said communication multiplicity is the number of users communicating in the random access channel.

* * * * *